United States Patent

Kaufman

[15] 3,674,164
[45] July 4, 1972

[54] HAND TRUCK FOR OIL DRUMS AND THE LIKE

[72] Inventor: Jonas J. Kaufman, Section # 12, VA Center, Wadsworth, Kans. 66089

[22] Filed: Aug. 24, 1970

[21] Appl. No.: 66,473

[52] U.S. Cl. ............................................214/377, 214/384
[51] Int. Cl. ..................................................B62b 1/06
[58] Field of Search ..........................214/370–384; 280/47.29

[56] References Cited

UNITED STATES PATENTS

| | | | |
|---|---|---|---|
| 3,247,989 | 4/1966 | Uribe.......................................214/383 |
| 3,278,061 | 10/1966 | Christensen............................214/383 |
| 2,485,085 | 10/1949 | Burch.....................................214/383 X |
| 2,509,240 | 5/1950 | Meehan..................................214/374 |
| 2,673,654 | 3/1954 | Kaufman................................214/383 X |

FOREIGN PATENTS OR APPLICATIONS

| 453,089 | 3/1968 | Switzerland ...........................214/384 |

*Primary Examiner*—Albert J. Makay
*Attorney*—Schmidt, Johnson, Hovey, Williams & Chase

[57] ABSTRACT

A hand truck for moving barrels or the like to and from an elevated platform utilizes a swingably mounted wheel and axle assembly which permits positioning of the barrel-supporting frame of the truck on the platform while the wheels remain on the ground. The wheel and axle assembly is also provided with an extensible connection with the frame which is operable concurrently with swinging of the axle to assure that the wheels remain in engagement with the ground, regardless of the weight of the elevated platform. A pair of free-swinging arms which extend forwardly of the hand truck frame are positionable beneath a barrel to support the latter while a gripping hook spaced from the arms engages the upper end of the barrel to allow tilting thereof in the direction of the hand truck. A cradle support on the frame of the hand truck opposite the wheel and axle assembly is mounted for extensible movement from a retracted position to an extended position to facilitate placement thereof on the elevated platform forwardly of the assembly wheels. This extensible cradle is movable to its retracted position under the weight of the hand truck as the latter is raised to an upright position on the platform.

6 Claims, 4 Drawing Figures

INVENTOR.
Jonas J. Kaufman

BY
Schmidt, Johnson, Hovey
Williams & Chase
ATTORNEYS.

HAND TRUCK FOR OIL DRUMS AND THE LIKE

This invention relates to apparatus for moving barrels or the like and, more particularly, to a hand truck for moving barrels to and from an elevated platform.

It is, therefore, an object of the present invention to provide a hand truck for moving barrels to and from an elevated platform.

Another object of the instant invention is to provide a hand truck which is constructed to move barrels from an elevated platform and which adjusts automatically to accommodate platforms of various heights.

An aim of my present invention is the provision of a hand truck for moving barrels to and from an elevated platform which can also be utilized for moving barrels located on a planar surface.

Still another of my objects is to provide a hand truck for moving barrels to and from an elevated platform without moving the wheels of the truck from the lower surface which supports the platform.

The present invention is an improvement over the hand truck shown and described in my prior U.S. Pat. No. 2,673,654 which issued on Mar. 30, 1954. A shortcoming of prior hand trucks in general has been their inability to remove barrels from elevated platforms such as the pallets which are commonly utilized in connection with forklift trucks. The present invention provides a hand truck which is useful as a conventional carrier device to move barrels or the like positioned on a building floor or the ground and is also readily adapted for moving barrels from an elevated platform.

The objects of the present invention are satisfied by a hand truck which utilizes a swingable wheel and axle assembly for supporting the barrel-grasping structure of the truck. An extensible connection between the truck frame and the wheel and axle assembly assures that the latter always remains in engagement with the ground during swinging movement. Cradle means on the frame of the truck is extensible to facilitate its placement upon the elevated platform prior to grasping of the barrel. A lock mechanism between the swingable wheel and axle assembly and the frame permits the truck to be utilized for moving barrels from a planar surface when this is desired.

Figure 1:
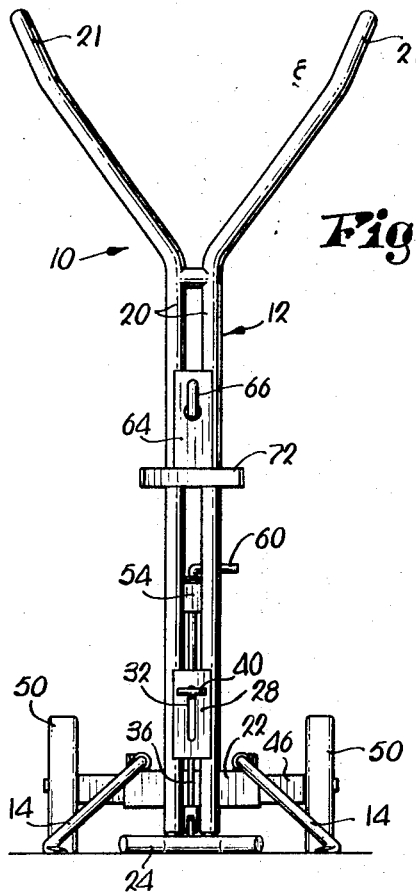
FIG. 1 is a front elevational view of the improved hand truck of the present invention.
Figure 2:
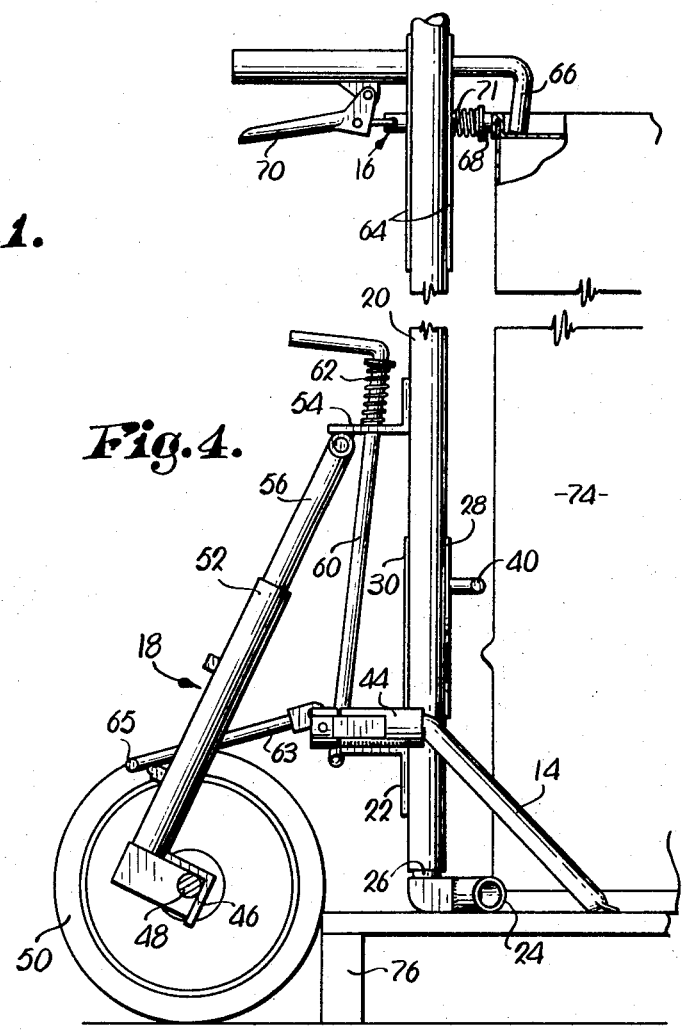
FIG. 2 is an enlarged, partial rear elevational view of the hand truck of FIG. 1.

Referring to the drawing, the hand truck of the invention is designated generally by the numeral 10 and includes an elongated frame member 12, a pair of lower barrel-supporting arms 14, a barrel-gripping mechanism 16, and a wheel and axle assembly 18. The frame member 12 is comprised of a pair of interconnected tubular components 20 each of which is angled at the upper end to present a pair of handles 21. Structure extending transversely of the member 12, in the form of an angle iron 22, is welded or otherwise secured to the components 20 adjacent the assembly 18. Cradle means in the form of a generally arcuate, tubular section 24 is rigid with a supporting block and is provided with a pair of spaced connecting rods 26 which are telescopically received within the lower end of the tubular components 20. A pair of spaced plates 28 and 30 are positioned on opposite sides of the components 20 with the plate 28 having a longitudinally extending slot 32 (FIG. 1) therein and the plate 30 having a generally rectangular opening 34 (FIG. 2). An elongated rod 36 is pivotally coupled with the block support of the section 24 and is provided with an L-shaped plate 38 rigid therewith at one end. A handle 40 is rigid with plate 38, and a coil spring 42 biases the plate 38 in the direction of the plate 30. A pair of sleeves 44 which are welded or otherwise secured to the angle iron 22, provide journal couplings for the arms 14 which are received therein.

Figure 4:
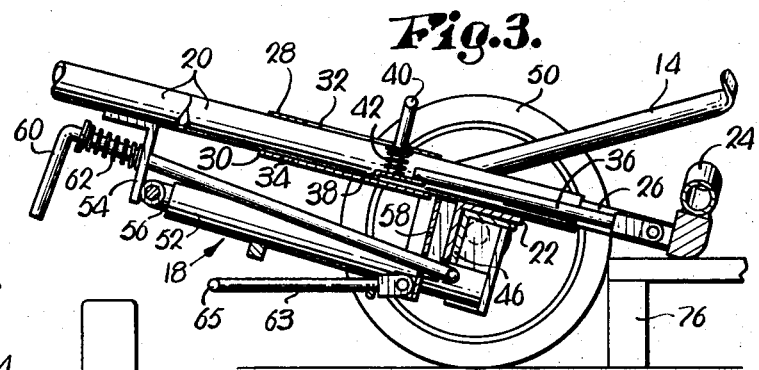
FIG. 4 is an enlarged, side elevational view of the hand truck as it would appear in position for moving a barrel from an elevated platform.

The wheel and axle assembly 18 includes a second angle iron 46 which is provided with a pair of axle shanks 48 welded or otherwise secured to the angle iron. A pair of wheels 50 are rotatably mounted on the shanks 48 for supporting the hand truck 10. A pair of tubular members 52 are also rigid with the angle iron 46 and project upwardly therefrom away from the wheels 50. A bracket 54 on the components 20 provides a mounting for a pair of elongated rods 56 which are pivoted to the bracket and are telescopically received within the tubular members 52 to present an extensible connection for the assembly 18. A second mounting bracket 58 which is rigid with and projects outwardly from angle iron 22 has an opening therein and an elongated rod 60 extends through this opening and a corresponding opening the bracket 54. As best illustrated in FIGS. 2 and 4, each end of the rod 60 is bent at a 90° angle. One of these ends presents a locking arm while the opposite end presents a handle. A coil spring 62 on the rod 60 is positioned against the plate 54 for purposes to be made clear hereinafter. A restraining arm 63 is pivoted to the bracket 58 and extends between the tubular components 52 where it terminates in a T-stop 65 (FIG. 2).

The gripping mechanism 16 includes a pair of spaced plates 64 disposed on opposite sides of the components 20 and secured together in a sufficiently loose manner to permit movement longitudinally of the components 20. Each of the plates 64 has a pair of spaced openings which are aligned with corresponding spaced openings on an adjacent plate. An L-shaped gripping member 66 extends through one pair of aligned openings in the plates 64. A portion of the member 66 is enlarged to present a gripping handle. A complemental gripping member 68 extends through the other pair of openings in the plates 64 and is provided with a handle 70 which is pivotally connected with one end of the L-shaped member 66. A coil spring 71 biases the member 68 in the direction of the vertical leg of the member 66. A second cradle support 72 is secured to one of the plates 64 beneath the members 66 and 68.

Figure 3:
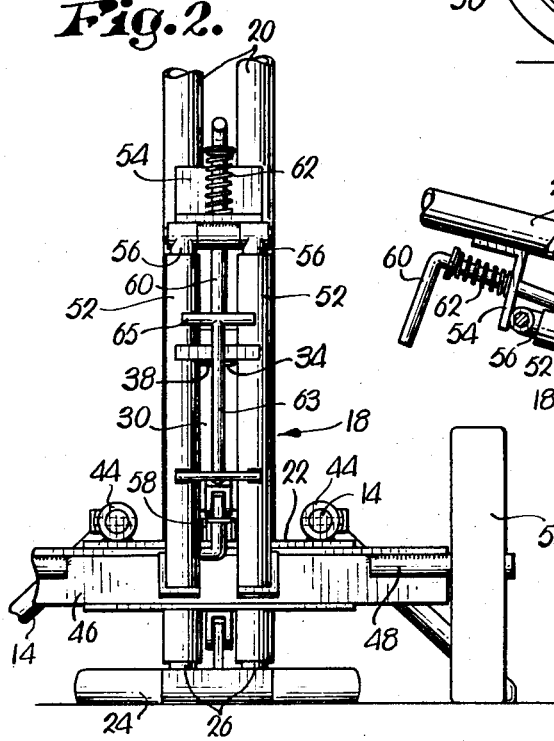
FIG. 3 is a cross-sectional view through the axle of the hand truck illustrating the manner in which the truck is tilted toward a horizontal plane to position the barrel-supporting arms and the cradle support on the elevated platform.

When the hand truck 10 is to be utilized to move a barrel 74 from an elevated platform 76, the handle 40 is first pulled to move the plate 38 from the opening 34 after which the handle is moved in the slot 32 to move the section 24 outwardly from the end of the frame member 12. The handle of the rod 60 is then turned to release the locking arm of the rod from beneath the angle iron 46 and the member 12 is tilted toward a horizontal plane to allow positioning of the cradle section 24 upon the platform 76 as illustrated in FIG. 3. The member 12 is then returned to a generally upright position as illustrated in FIG. 4, and the handle 70 is grasped to move the mechanism 16 into proper position to allow the gripping members 66 and 68 to grip the upper edge of the barrel 74. As the member 12 is tilted to this upright position the wheel and axle assembly 18 moves away from the member 12 as a result of the previous release of the locking rod 60 and the pivotal connection of the rods 56 with the bracket 54. This allows the wheels 50 to clear the edge of the platform 76 and remain in engagement with the ground, floor, or other supporting surface. The stop 65 on the rod 63 limits the extent of swinging movement of the assembly 18 away from the member 12. As the truck 10 is returned to its upright position, the section 24 is returned, under the weight of the truck, to its retracted position where it will not interfere with subsequent movement of the truck along the floor or ground. Subsequently, the barrel 74 is tilted in the direction of the hand truck 10 and the angle iron 22 is returned to its normal position resting upon the angle iron 46. The cradles 24 and 72 restrain the barrel and prevent it from shifting laterally of the member 12. The barrel 74 can then be moved to either a second platform such as 76 or placed upon the floor or ground.

When the hand truck 10 is to be used for moving barrels or the like located upon a planar surface such as the floor of a building, the rod 60 is maintained in locking engagement with the angle iron 46 and the cradle section 24 is retained in its retracted position. This allows barrels to be moved from one location to another in a conventional manner.

From the foregoing description it is apparent that the hand truck of the present invention is quickly and easily adapted for moving barrels or the like from an elevated platform in a manner heretofore not possible. It will also be appreciated that, by virtue of the cradle section 24 occupying a position at the end of the frame member 12, the truck 10 is provided with a support stand which maintains it in an upright position at all times, thus precluding displacement of it in a storage area.

Having thus described the invention, what is claimed as new and desired to be secured by Letters Patent is:

1. Hand truck apparatus for moving barrels or the like to and from an elevated platform, said apparatus comprising:
    an elongated frame member;
    means on the member for supporting the barrel beneath the latter;
    means on the member for gripping the barrel at the upper end of the latter;
    a wheel and axle assembly;
    a structure on the member normally engaging the axle of said assembly with the member supported by said axle; and
    coupling means pivotally securing said assembly to the member for swinging movement of the axle toward and away from said structure as the member is tilted on the platform during loading of the barrel onto the hand truck and removal of the barrel therefrom,
    said assembly being provided with an extensible connection between the axle and the member operable concurrently with said swinging movement of the axle.

2. Apparatus as set forth in claim 1, and means interposed between said member and said connection for limiting the extent of swinging movement of the axle away from the member and limiting the extensibility of the axle away from the member.

3. Apparatus as set forth in claim 1, wherein said extensible connection comprises connecting rod means pivotally secured to said member and tubular means on said assembly for telescopically receiving said connecting rod means.

4. Hand truck apparatus for moving barrels or the like to and from an elevated platform, said apparatus comprising:
    an elongated frame member;
    means on the member for supporting the barrel beneath the latter;
    means on the member for gripping the barrel at the upper end of the latter;
    a wheel and axle assembly;
    structure on the member normally engaging the axle of said assembly with the member supported by said axle;
    coupling means pivotally securing said assembly to the member for swinging movement of the axle toward and away from said structure as the member is tilted on the platform during loading of the barrel onto the hand truck and removal of the barrel therefrom;
    cradle means on the member opposite said assembly for engaging a barrel carried by said hand truck,
    said cradle means extending beyond the leading edge of said wheels when said member is tilted toward a horizontal plane for placement of said cradle means on said elevated platform; and
    means mounting said cradle means for extensible movement from a retracted position to an extended position away from said member to facilitate placement thereof on said elevated platform.

5. Apparatus as set forth in claim 4, wherein said cradle means is movable from said extended position to said retracted position under the weight of said member as the latter is raised to an upright position on said platform.

6. Apparatus as set forth in claim 5, and a pair of sleeves on said member, said barrel supporting means comprising a pair of arms received in said sleeves and projecting forwardly of the member for free swinging movement relative to the latter.

* * * * *